United States Patent [19]
Smith

[11] 3,986,204
[45] Oct. 12, 1976

[54] VIDEO SYNCHRONIZING APPARATUS AND METHOD

[75] Inventor: Clyde Smith, North Salem, N.Y.

[73] Assignee: Thomson-CSF Laboratories, Inc., Stamford, Conn.

[22] Filed: Feb. 6, 1975

[21] Appl. No.: 547,390

[52] U.S. Cl. .................................. 358/22; 178/6.8; 178/7.2; 178/DIG. 6; 178/69.5 TV
[51] Int. Cl.$^2$ .................... H04N 5/22; H04N 9/535; H04N 5/06
[58] Field of Search ........ 358/22; 178/5.6, 69.5 CB, 178/69.5 TV, 69.5 DC, DIG. 23, DIG. 6, 7.1, 6, 6.8, 7.2

[56] References Cited
UNITED STATES PATENTS

| | | | |
|---|---|---|---|
| 3,296,367 | 1/1967 | Cassagne et al. | 358/22 |
| 3,479,459 | 11/1969 | Scipione | 178/69.5 TV |

*Primary Examiner*—John C. Martin
*Attorney, Agent, or Firm*—Martin Novack

[57] ABSTRACT

An apparatus for use in conjunction with a processing system of the type which receives an input video signal comprising successive scanlines, each of which consists of a blanking portion that includes timing signals followed by an active portion representative of color picture information. The processing system is of a type that has an inherent delay whereby the output thereof is a television video signal delayed with respect to the input video signal. The invention is directed to an apparatus for generating a revised output video signal having timing signals in synchronism with the input video. In accordance with the invention there is provided a means for generating blanking portions in synchronism with the blanking portions of the input video signal. Means are further provided for selecting portions of the output of the processing system which occur between the generated blanking portions and for combining the generated blanking portions and the selected portions to produce the revised output video signal.

6 Claims, 4 Drawing Figures

BLACK LEVEL
→ TIME 3,986,204

VIDEO SYNCHRONIZING APPARATUS AND METHOD

BACKGROUND OF THE INVENTION

This invention relates to television broadcasting and, more particularly, to an apparatus and method for processing television video signals in a broadcasting plant.

In a television broadcasting plant there are generally a plurality of video signals generated and available for use in forming the ultimately transmitted program video. The video signals may be available from different television cameras or video tape machines and are typically combined in various ways to achieve desired sequences and special effects in the program video. In order to achieve the orderly combination of different encoded video signals, it is necessary that they be time synchronized, and this is readily accomplished by using a common source of synchronizing signals, denoted as "plant sync," when encoding each video signal.

A problem arises, however, when an already encoded video signal is subjected to processing whereby it is unavoidably time delayed. Unless all other encoded video signals are also subjected to the same time delay, limitations arise in utilizing the processed video signal for special effects in conjunction with other video signals. For example, to perform a chroma keying operation on a pair of already encoded video signals it is necessary to decode at least one of the signals in order to derive the appropriate keying signal, such as a keying signal which is active during blue picture areas. The decoding operation typically introduces a delay of, say, 460 ns which, if uncorrected for, would cause a phase error in the color picture signal. Accordingly, by employing a variable delay, the entire video signal output of the chroma keyer system is delayed by a total of 558 ns. In this manner, and since 558 ns is the period of time of two cycles of color subcarrier, the delay introduced by the chroma keyer does not interfere with ultimate decoding of the output of the chroma keyer since the appropriate color phase relationship of the modulated color subcarrier signal is maintained. In fact, the output of the chroma keying apparatus can be used for most conventional television broadcast plant operations since the delay of 558 ns is not noticeable when, for example, this signal is cut into an undelayed video signal, the time difference not being noticeable to the eye. However, when it is desired to utilize certain special effects, such as a "fade" between two video signals, this effect cannot be used since the timing differences between the signals will be noticeable when the signals are effectively "mixed" during the special effects operation. As a consequence, a video signal that has been processed through a chroma keyer, or similar equipment introducing delay to an already encoded video signal, is not utilized for certain types of special effects in the prior art broadcasting plant.

It is one object of the present invention to provide solution to the problem as set forth.

SUMMARY OF THE INVENTION

The present invention relates to an apparatus and method for use in conjunction with a processing system which receives an input television video signal comprising successive scanlines, each of which consists of a blanking portion including timing signals followed by an active portion representative of picture information. The processing system is of a type discussed hereinabove which has an inherent delay whereby its output is a television video signal delayed with respect to the input video signal. In accordance with the invention there is provided an apparatus for generating a revised output video signal having timing signals in synchronism with the input video signal. Means are provided for generating blanking portions in synchronism with the blanking portions of the input video. Further means are provided for selecting portions of the output of the processing system which occur between the generated blanking portions and for combining the generated blanking portions and the selected portions to produce the revised output video signal.

Further features and advantages of the invention will become more readily apparent from the following detailed description when taken in conjunction with the accompanying drawings.

DESCRIPTION OF THE PREFERRED EMBODIMENTS

Figure 1:
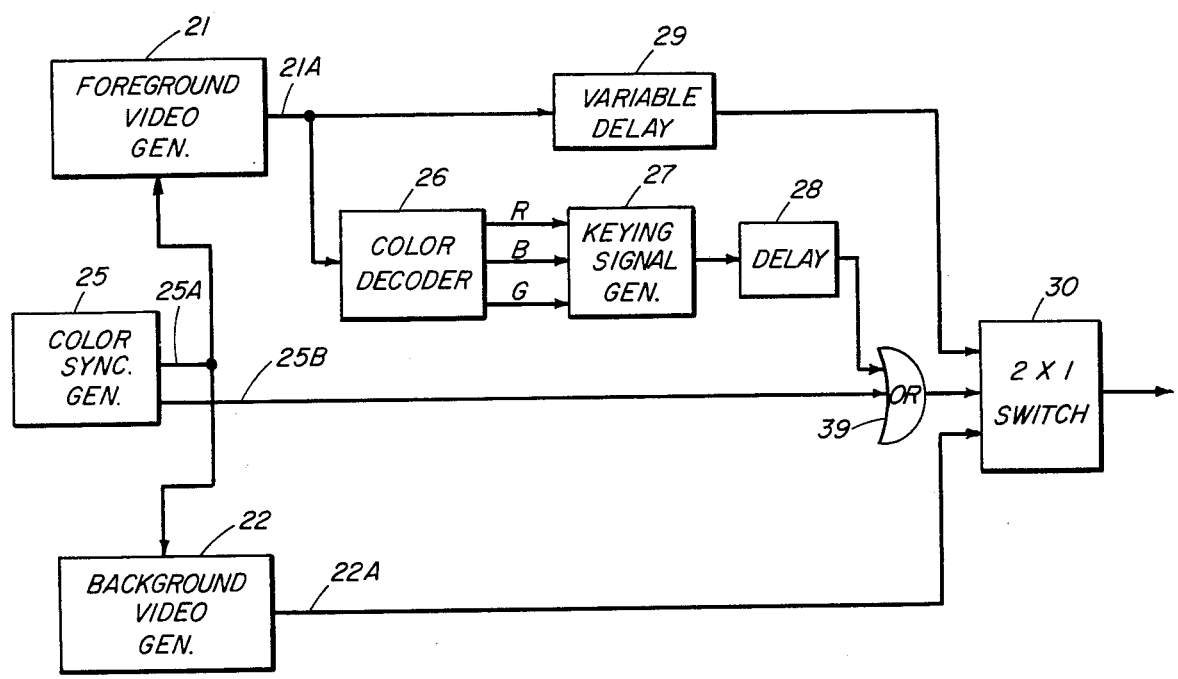
FIG. 1 is a block diagram of an embodiment of the invention as used in conjunction with a chroma keying system.

Referring to FIG. 1, there is shown a block diagram of an embodiment of the invention as used in conjunction with a chroma keying apparatus operating on encoded video signals. A pair of video generators 21 and 22, respectively designated as foreground and background generators, may typically be either television cameras or video tape recorders in conjunction with conventional encoding equipment. A color sync generator provides timing to both video generators on line 25A, so the resultant encoded foreground video on line 21A is in time synchronism with the encoded background video on line 22A.

In accordance with the practice in commercially available chroma keying equipments, such as the CBS Laboratories Model 7000 which can operate on an already-encoded video signal, there is provided a color decoder 26 which receives the encoded foregound video on line 21A and recovers color signals designated R, G and B. These signals are coupled to a keying signal generator 27 which typically forms a keying signal upon sensing a desired color in the foregound video, for example blue. A suitable keying signal generator is disclosed in U.S. Pat. No. 2,974,190 of Geiger which teaches how a sharply defined keying signal can be generated by forming the difference between the color being sensed, such as blue, and a second color, such as red. The output of the keying signal generator 27 is coupled through a delay line 28 to one input of an OR gate 39, the other input of which is video blanking, a signal which is shown as being available from sync generator 25 on a line 25B. The delay time of delay line 28 is selected to provide the delay necessary to adjust the total delay experienced through circuits 26, 27 and 28 to be an integral number of full color subcarrier cycles. The size of delay 28 will thus be generally a function of the delay introduced by the color decoding operation. For example, if the inherent delay of color decoder 26 is 460 ns, delay 28 is set at 98 ns so that the total delay is 558 ns; i.e., substantially two cycle periods of color subcarrier.

The encoded foreground video on line 21A is also coupled to a variable delay 29 which is adjustable to introduce the same delay experienced by the signals passing through blocks 26, 27 and 28; e.g., a delay of 558 ns. The output of delay 29 is coupled to the first input terminal of a 2×1 switch 30. The encoded background video on line 22A is coupled to the second input terminal of the switch 30 and the output of OR gate 39 is coupled to the "switching" input terminal of switch 30. The 2×1 switch 30, well known in the art, normally passes the signal received at its first input terminal except when the signal level at its switching input terminal exceeds a predetermined threshold level, whereupon it passes the signal received at its second input terminal. Thus, when the output of OR gate 39 is "low" (or off) the output of switch 30 is the delayed encoded foreground video, whereas when the output of OR gate 39 is "high" (or on) the output of switch 30 is the encoded background video.

Figure 2:
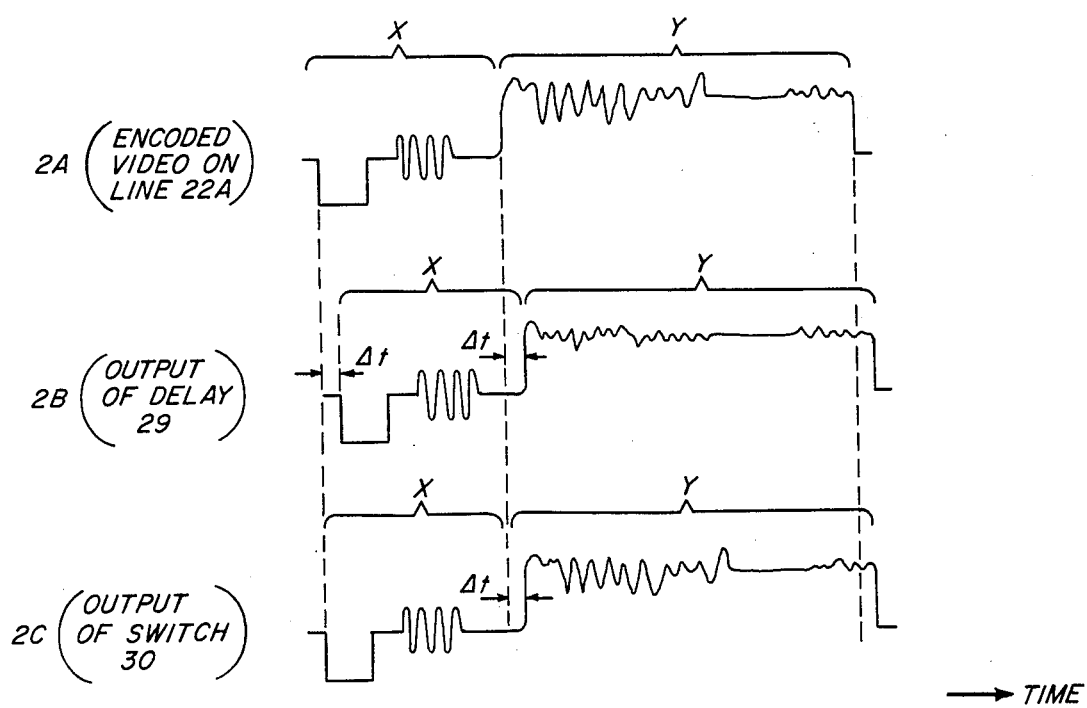
FIG. 2 illustrates graphically television video signals useful in describing the operation of the invention.

Operation of the invention can be better understood with the aid of FIG. 2. The graphs 2A and 2B show, on a common time reference, a scanline of encoded video at the outputs of background video generator 22 and delay 29, respectively. It is seen that the signal in graph 2B lags the signal in graph 2A by the delay time $\Delta t$ introduced by delay 29, for example 558 ns. (As used herein, the term "active portion" refers to that part of a video scanline which is representative of picture information to be displayed and the term "blanking portion" refers to that part of the video scanline normally occuring between picture information segments, the blanking portion including horizontal sync, burst, etc.) In FIG. 2 the blanking portion in each graph is denoted by the brackets "X" and the active portion by the brackets "Y." The video blanking signal on line 25B is substantially in synchronism with the blanking portion of the background encoded video on line 22A since the latter signal derives its blanking portion from color sync generator 25. The video blanking signal is one input to OR gate 39, so it follows that the switching input terminal of switch 30 is activated during the blanking portion of the background encoded video on line 22A. This results in the blanking portion of the switch output being in synchronism with the blanking portion of the undelayed background encoded video, as can be seen by the signals portions labelled X in FIG. 2. After the end of the video blanking signal on line 25B the OR gate 39 is disabled except when a keying signal is produced by keying signal generator 27 upon sensing a predetermined color in the input video. The generation of an initial keying signal involves a delay of at least $\Delta t$ (including delay 28), during which time OR gate 29 is disabled. Therefore, the 2 × 1 switch 30 passes the delayed foreground video (output of delay 29) during this $\Delta t$. As is seen in FIG. 2, this causes an "extension" of the effective width of the blanking portion of the video output by $\Delta t$.

It is evident from graph 2C that the output of switch 30 meets the objective of obtaining a processed encoded video signal which has timing signals that are in synchronism with the timing of the undelayed encoded video (either foreground or background). Accordingly, this output can be utilized in the television broadcast plant in conjunction with undelayed composite video signals, even to produce special effects such as fades. The picture content of the output of switch 30 will depend on the selected color keying parameters and it can be noted that the position of objects in the foreground video with respect to the background video will be displaced slightly to the right due to the delay experienced by the foreground video, but this will generally not be noticeable to the viewer.

Figure 3:
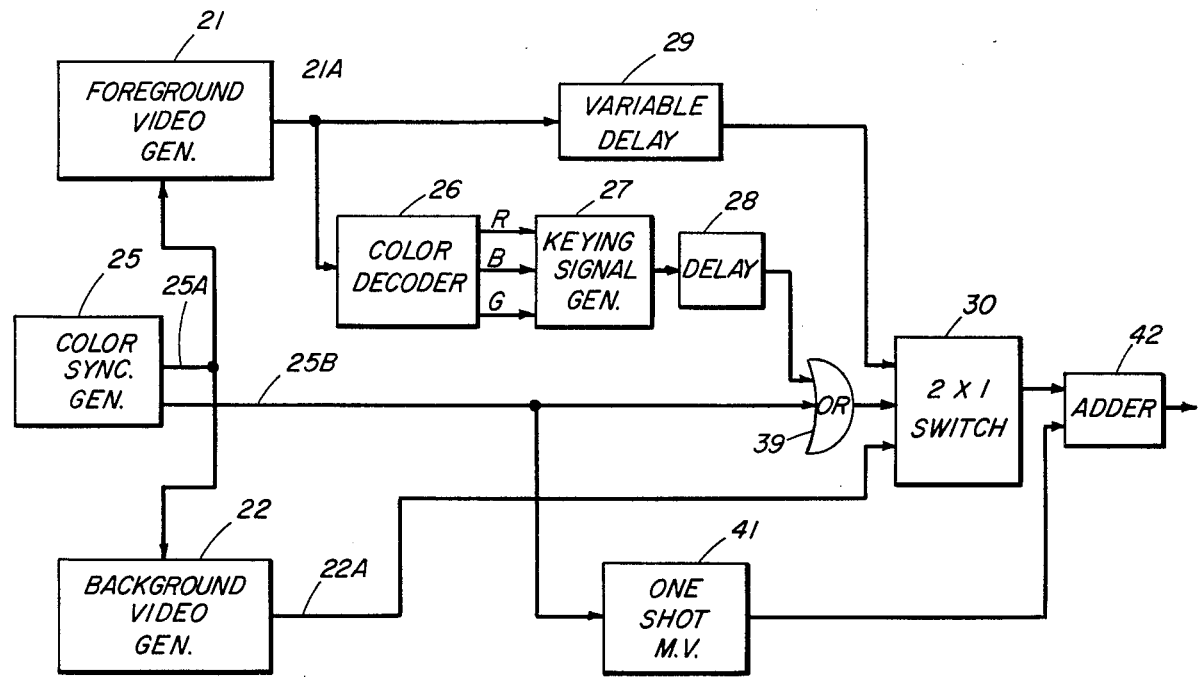
FIG. 3 shows a block diagram of another embodiment of the invention.
Figure 4:
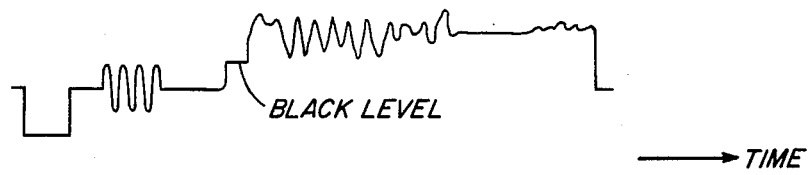
FIG. 4 illustrates a television video signal of the type generated using the embodiment of FIG. 3.

Referring to FIG. 3, there is shown a block diagram of an embodiment of the invention wherein the blanking portion of the output encoded video is maintained at the standard duration of 11.11 microseconds. This embodiment is the same as in FIG. 1 except that a one-shot multivibrator 41 and an adder 42 are provided. It will be recalled that the circuit of FIG. 1 generated an output (graph 2C) having a blanking portion effectively extended by $\Delta t$, typically 558 nanoseconds. While this result is not necessarily bothersome, broadcasting regulations may require blanking and active video portions of specified durations. In the embodiment of FIG. 3 black level video is inserted during the $\Delta t$ extension of the blanking portion. This is achieved by providing the one-shot multivibrator 41 which is adapted to be triggered by the trailing edge of the video blanking signal on line 25B. The one-shot 41 has an unstable time of $\Delta t$ during which it generates a voltage output set at a level of 7.5 IRE units (black level or approximately 0.053 volts). The output pulse from one-shot 41 is added to the output of switch 30 by adder 42 to produce a signal as shown in FIG. 4; i.e., the same signal as in graph 2C except that black level is inserted in the interval by which the blanking portion had been extended.

The invention has been described with reference to particular embodiments, but it will be appreciated that variations within the spirit and scope of the invention will occur to those skilled in the art. While the invention is shown in conjunction with an encoded video chroma keying system, it will be understood that the invented apparatus can also be used to advantage as set forth in conjunction with other processing or transmission systems (color or monochrome) having inherent delay.

I claim:

1. For use in conjunction with a processing system which receives an input television video signal comprising successive scanlines each consisting of a blanking signal portion that includes timing signals followed by an active signal portion representative of picture information, said processing system having an inherent time delay whereby the output thereof is a television video signal delayed with respect to the input video signal; an apparatus for generating a revised output video signal having timing signals in synchronism with said input video, comprising:
    means for generating blanking signal portions in synchronism with the blanking signal portions of said input video;
    means for selecting signal portions of the output of said processing system which occur between the generated blanking signal portions; and
    means for combining the generated blanking signal portions and the selected signal portions to produce said revised output video signal.

2. An apparatus as defined by claim 1 further comprising means for generating voltage pulses initiated in synchronism with the beginning of said selected signal portions and which have durations that substantially correspond to said inherent delay; and means for combining said voltage pulses into said revised output video signal.

3. An apparatus as defined by claim 2 wherein said voltage pulses have an amplitude corresponding to black level video.

4. For use in conjunction with a processing system which receives an input television signal comprising successive scanlines each consisting of a blanking signal portion that includes timing signals followed by an active signal portion representative of picture information, said processing system having an inherent time delay whereby the output thereof is a television video signal delayed with respect to the input video signal; a method for generating a revised output video signal having timing signals in synchronism with said input video, comprising the steps of:
generating blanking signal portions in synchronism with the blanking signal portions of said input video;
selecting portions of the output of said processing system which occur between the generated blanking signal portions; and
combining the generated blanking signal portions and the selected signal portions to produce said revised output video signal.

5. A method as defined by claim 4 further comprising the steps of generating voltage pulses initiated in synchronism with the beginning of said selected signal portions and having durations that substantially correspond to said inherent delay; and combining said voltage pulses into said revised output video signal.

6. A chroma keying system which receives first and second encoded color television signals, each synchronized by plant synchronization signals from a common source, and generates output color television signals having synchronization signals in time synchronism with said plant synchronization signals, comprising:
keying signal generating circuitry responsive to said first television signal for generating a keying signal in response to a sensed color condition in said first television signal;
gate means responsive to said keying signal and said plant synchronization signals;
means for delaying said first television signal; and
switch means for receiving as its inputs said delayed first television signal and said second television signal and responsive to the output of said gate means for selecting one of its inputs as said output television signal.

* * * * *